(No Model.) 7 Sheets—Sheet 1.

A. G. BURTON.
PERFORATING MACHINE.

No. 323,295. Patented July 28, 1885.

Witnesses.
Jno. W. Stockett.
N. J. Osgood.

Inventor.
Augustus G. Burton
by M. E. Dayton
Attorney.

(No Model.) 7 Sheets—Sheet 2.
A. G. BURTON.
PERFORATING MACHINE.
No. 323,295. Patented July 28, 1885.
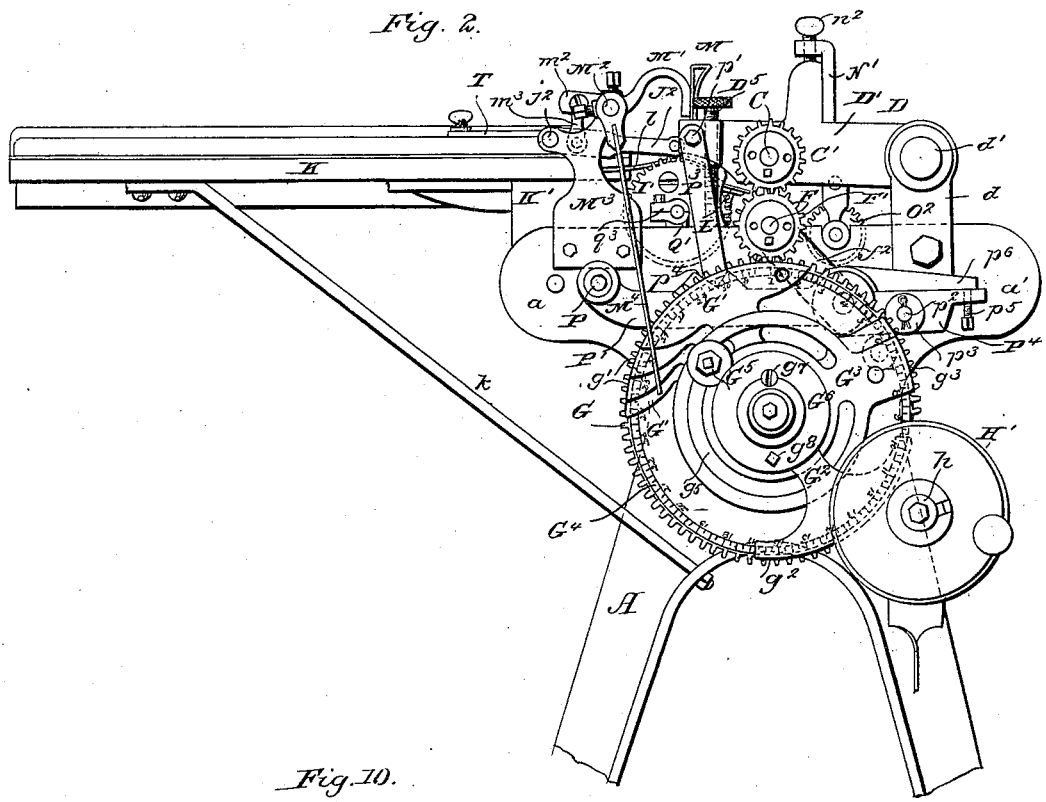
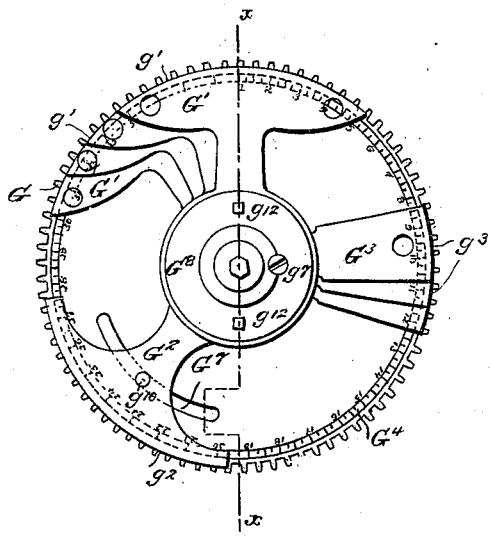
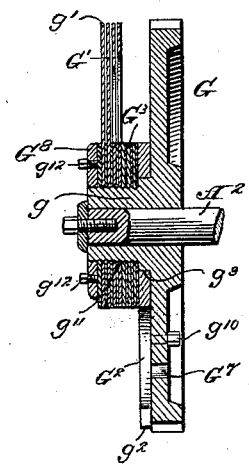
Witnesses:
J. W. Stockell.
W. J. Osgood.
Inventor
Augustus G. Burton.
by M. E. Dayton
Attorney (No Model.) 7 Sheets—Sheet 3.
A. G. BURTON.
PERFORATING MACHINE.
No. 323,295. Patented July 28, 1885.
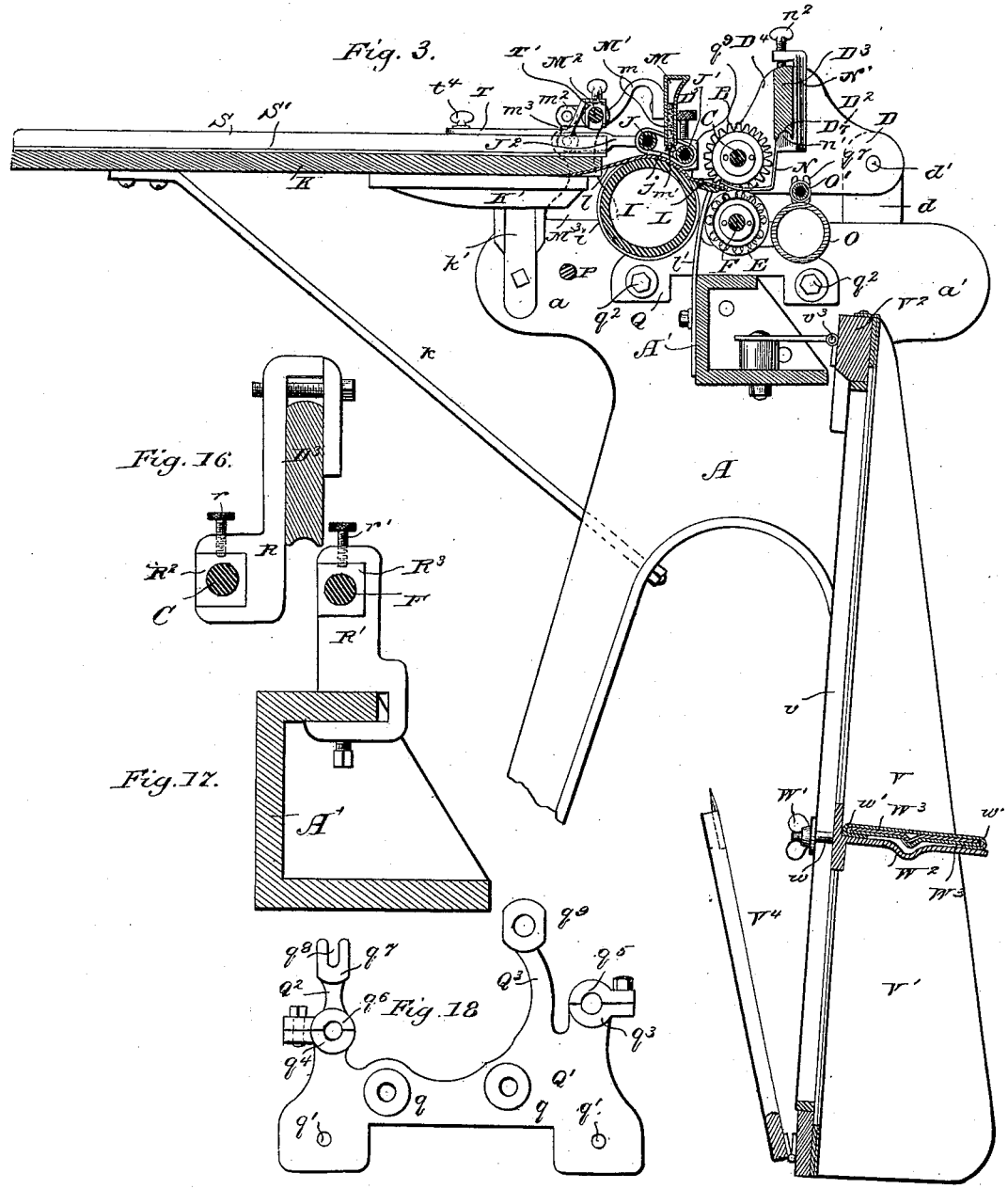
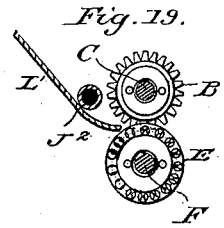
Witnesses:
Jno. W. Stockett
H. J. Osgood.
Inventor
Augustus G. Burton.
by M. E. Dayton
Attorney (No Model.)
A. G. BURTON.
PERFORATING MACHINE.
No. 323,295.  Patented July 28, 1885.
7 Sheets—Sheet 4.
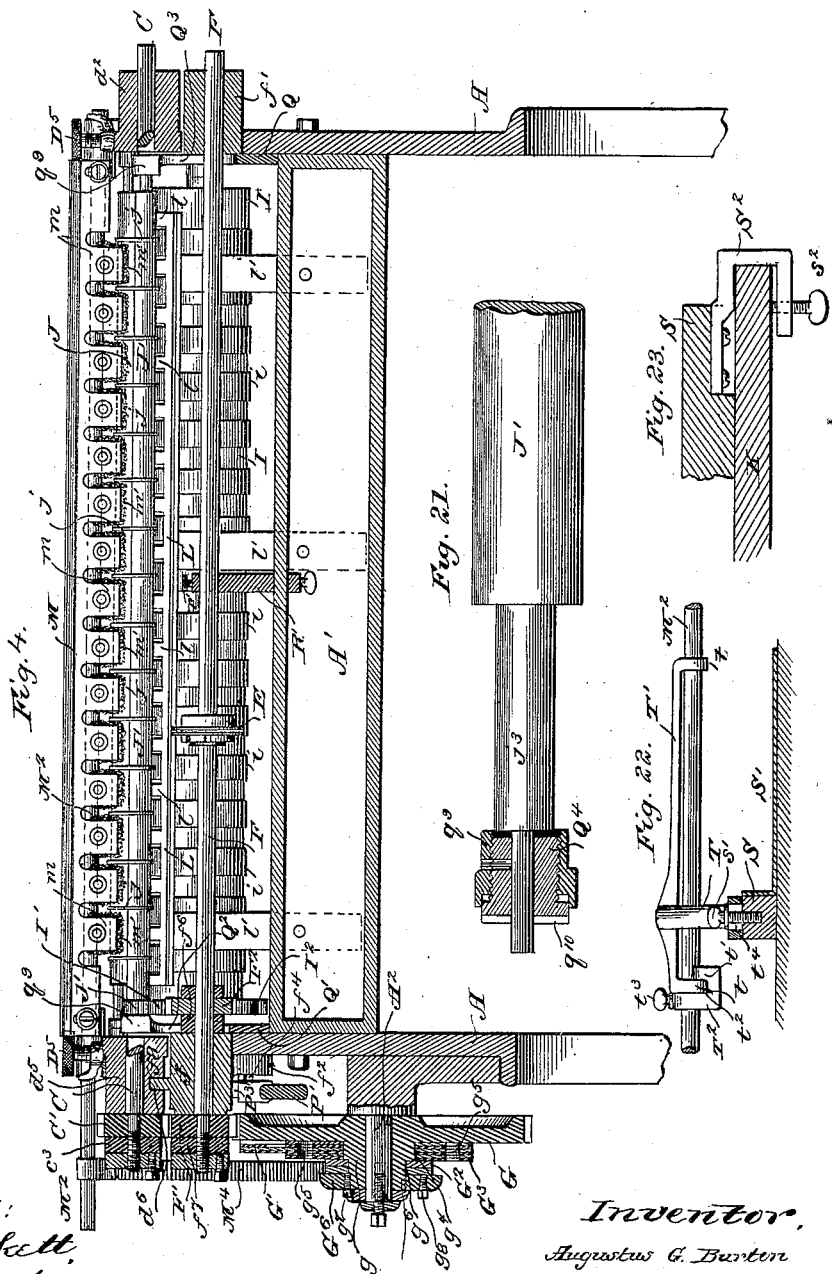
Witnesses:
Jno. W. Stockett
W. J. Osgood
Inventor,
Augustus G. Burton
by W. E. Dayton
Attorney.

(No Model.) 7 Sheets—Sheet 5.
A. G. BURTON.
PERFORATING MACHINE.
No. 323,295. Patented July 28, 1885.
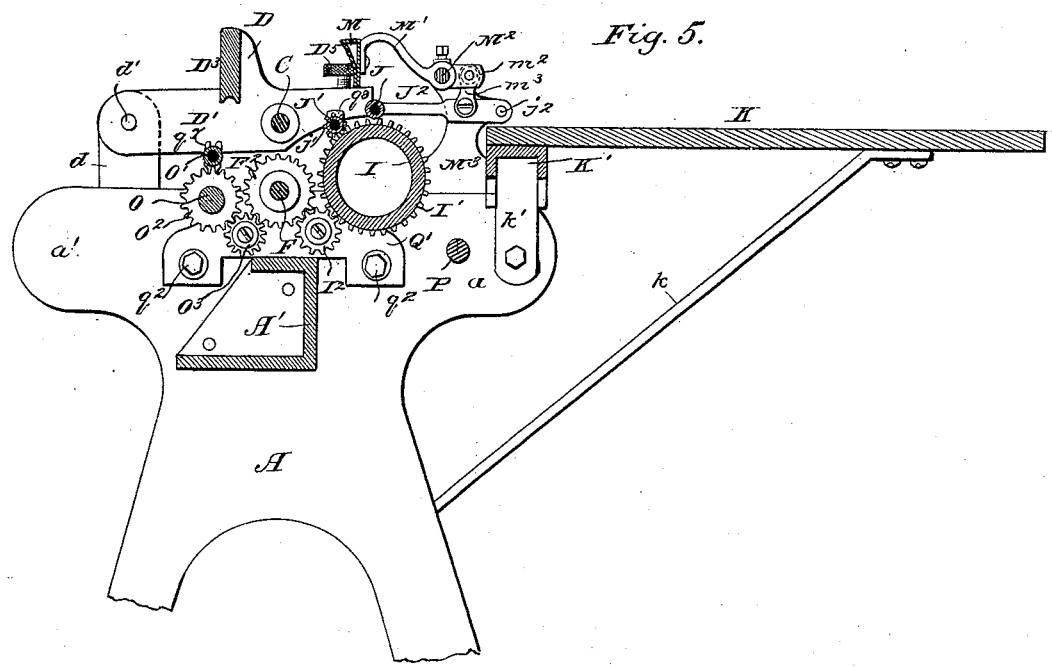
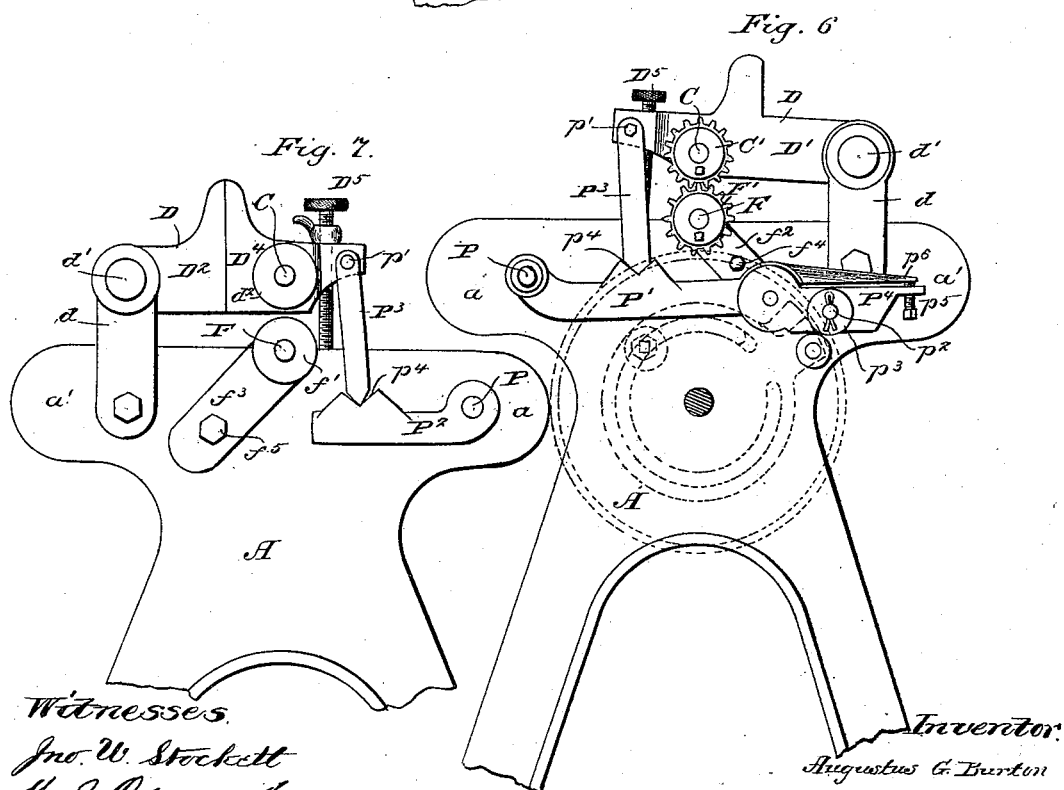
Witnesses
Jno. W. Stockett
W. J. Osgood
Inventor
Augustus G. Burton
by M. E. Dayton
Attorney.

(No Model.) 7 Sheets—Sheet 6.
A. G. BURTON.
PERFORATING MACHINE.
No. 323,295. Patented July 28, 1885.
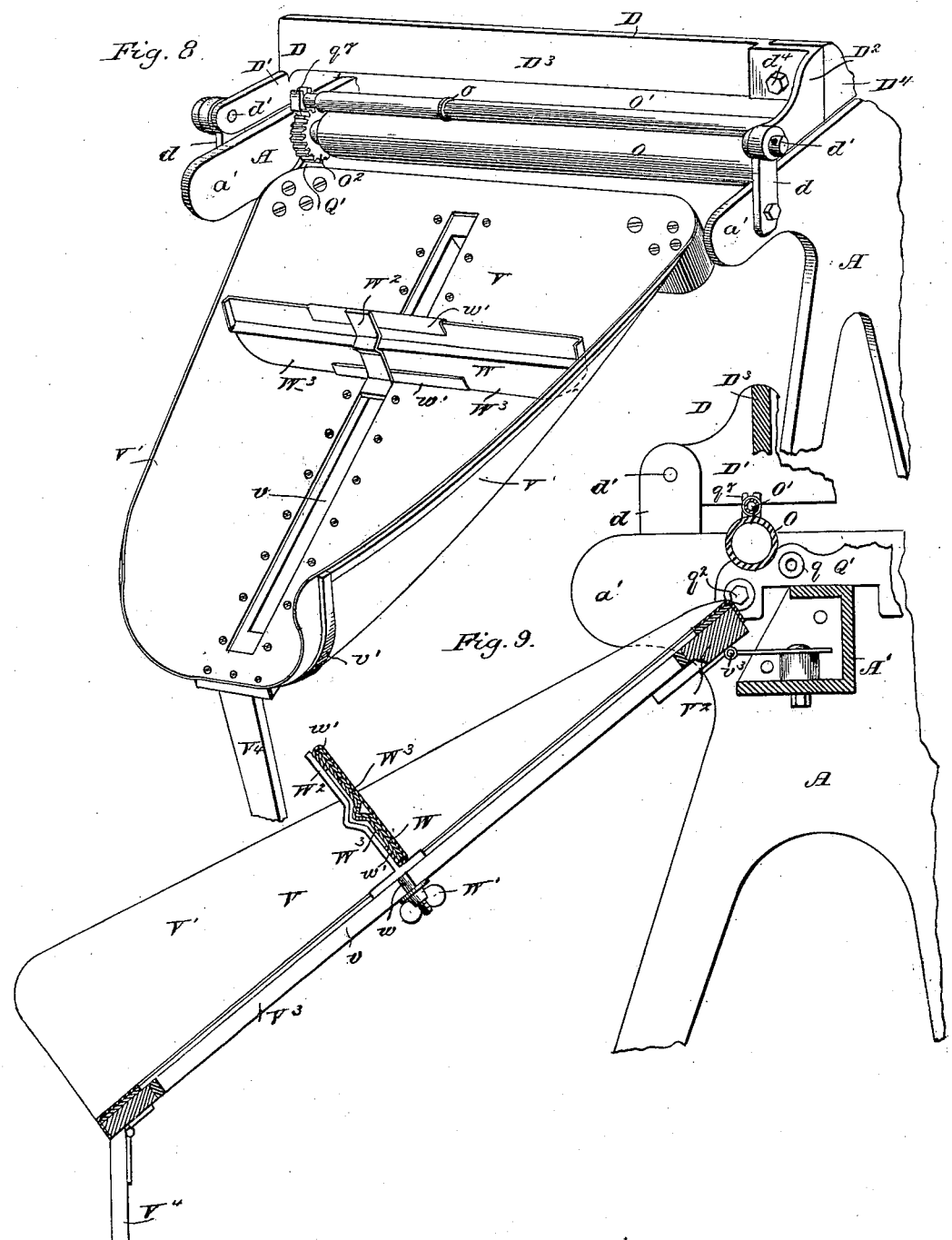
Witnesses:
Jno. W. Stockett.
W. J. Osgood.
Inventor:
Augustus G. Burton
by M. E. Dayton
Attorney
N. PETERS, Photo-Lithographer, Washington, D. C.

(No Model.) 7 Sheets—Sheet 7.
A. G. BURTON.
PERFORATING MACHINE.
No. 323,295. Patented July 28, 1885.
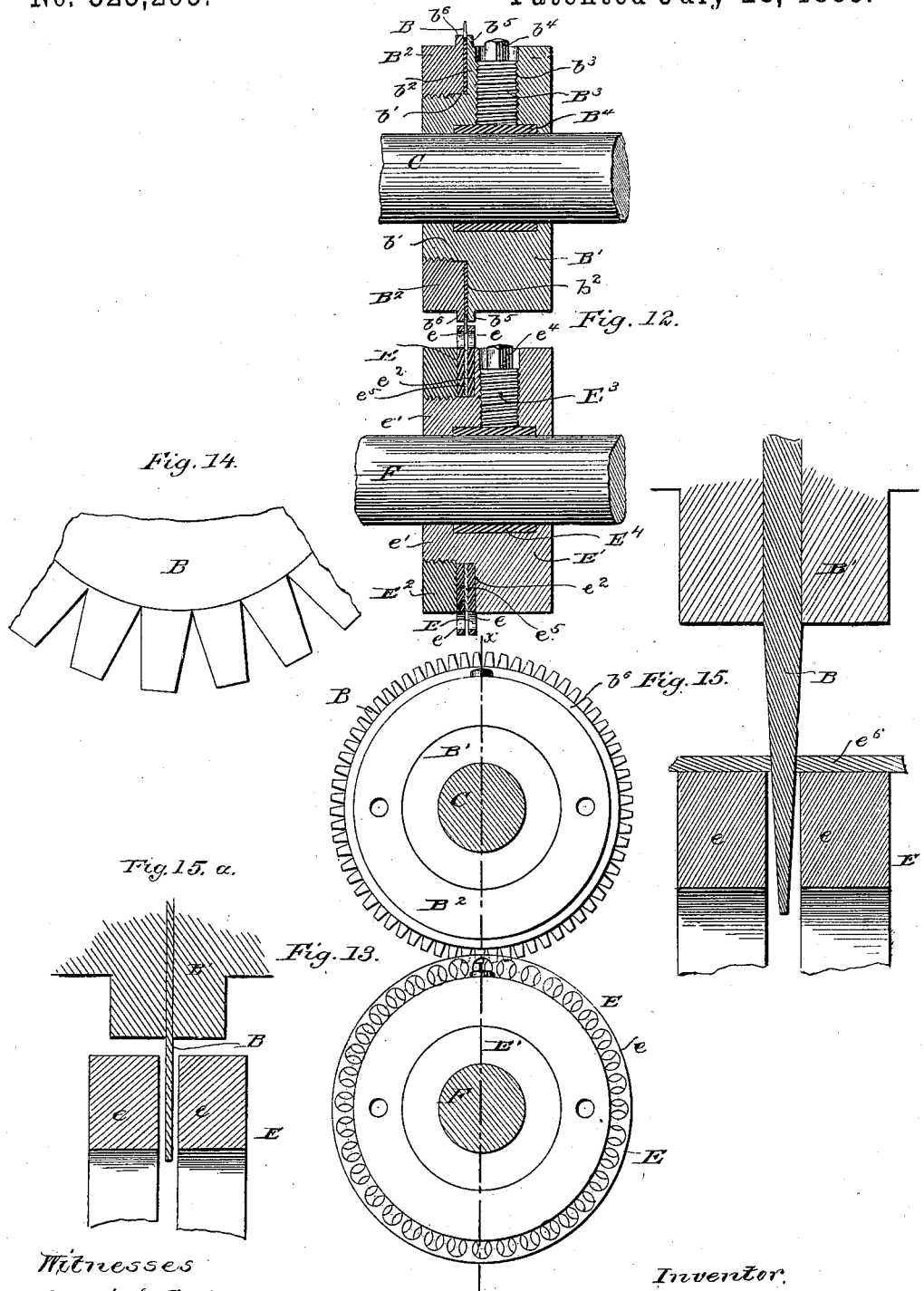
Witnesses
Jno. W. Stockett
C. C. Poole
Inventor,
Augustus G. Burton
by M. E. Dayton
Attorney

UNITED STATES PATENT OFFICE.

AUGUSTUS G. BURTON, OF CHICAGO, ILLINOIS.

PERFORATING-MACHINE.

SPECIFICATION forming part of Letters Patent No. 323,295, dated July 28, 1885.

Application filed March 5, 1884. (No model.)

*To all whom it may concern:*

Be it known that I, AUGUSTUS G. BURTON, of Chicago, in the county of Cook and State of Illinois, have invented certain new and useful Improvements in Perforating-Machines; and I do hereby declare that the following is a full, clear, and exact description thereof, reference being had to the accompanying drawings, and to the letters of reference marked thereon, which form a part of this specification.

This invention relates to improvements in machines for perforating or partially severing sheets of paper for the purpose of facilitating the division of such sheets in the line of the perforations. Its object is to generally improve the construction and operation of the class of machines above referred to; and it consists in the matters hereinafter described, and pointed out in the claims.

The machine herein illustrated as embodying my invention resembles in some particulars a machine shown and described in a separate application for patent upon perforating-machines made by me upon the 18th day of January, 1882, Serial No. 50,418, to which further reference will be made in the following specification.

Figure 1:
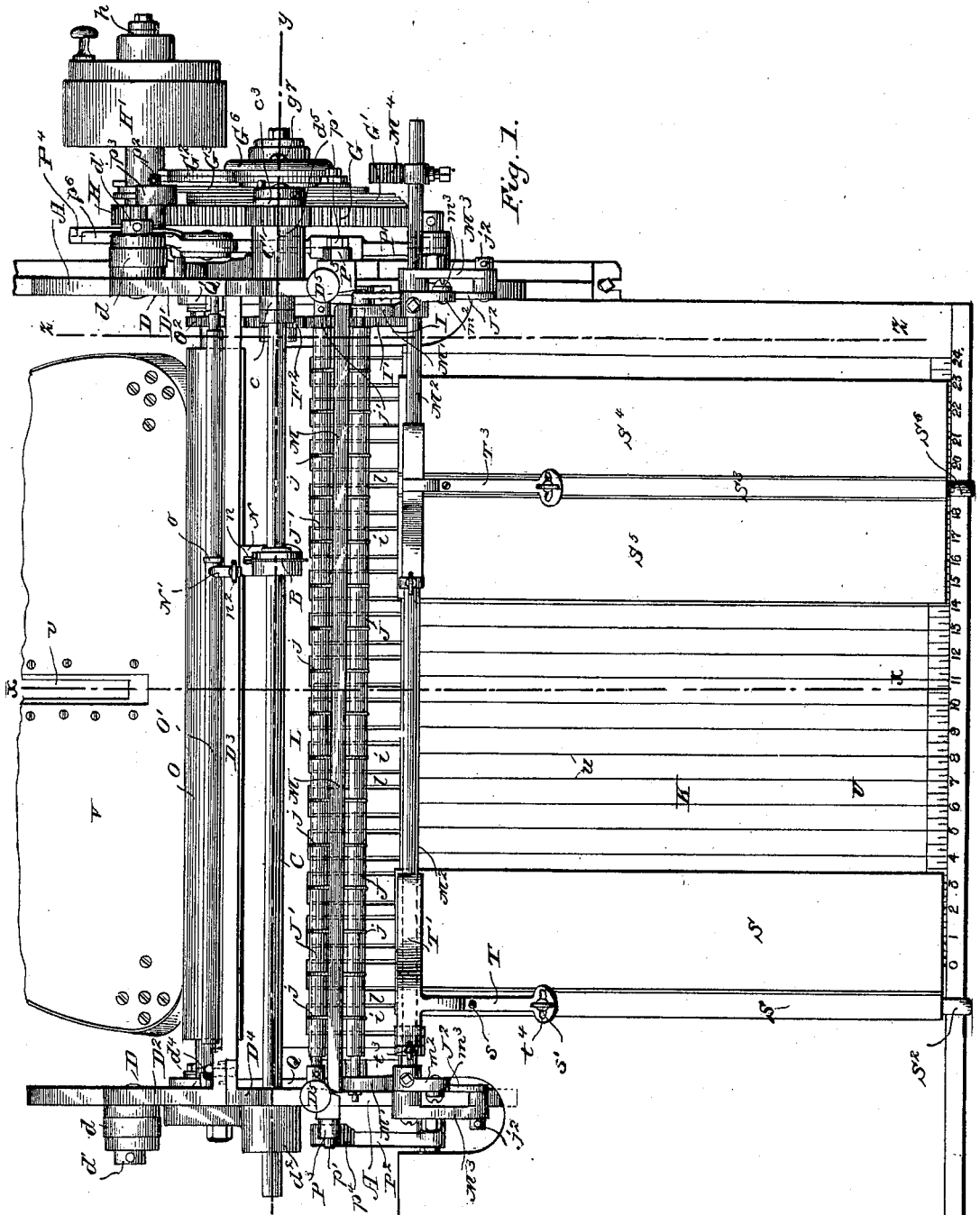
Figure 2:
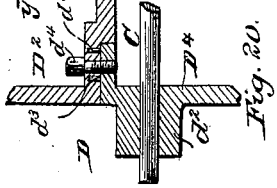

In the accompanying drawings, Figure 1 is a top or plan view of a machine embodying my improvements. Fig. 2 is an end elevation of the same. Fig. 3 is a vertical transverse section taken on line $x\,x$ of Fig. 1. Fig. 4 is a vertical longitudinal section taken upon the line $y\,y$ of Fig. 1. Fig. 5 is a vertical section upon the line $z\,z$ of Fig. 1. Fig. 6 is a fragmentary end elevation of the machine with the cam-plates and spur-wheel removed. Fig. 7 is a fragmentary view of the end of the machine opposite to that shown in Fig. 6. Fig. 8 is a perspective view of the rear portion of the machine, showing a hinged receptacle for paper. Fig. 9 is a central vertical section of the parts shown in Fig. 8. Fig. 10 is a detail view of the cam-plates for lifting the cutters, and the spur-wheel to which said cam-plates are attached. Fig. 11 is a section taken upon line $x\,x$ of Fig. 10. Fig. 12 is a vertical section of one of the cutters and its matrix. Fig. 13 is a side elevation of the same. Fig. 14 is a fragmentary view of a portion of the edge of the cutter, much enlarged. Fig. 15 is a detail section, much enlarged, of the edge of the cutter and the matrix. Fig. $15^a$ is a similar view of another form of the cutter. Figs. 16 and 17 are views of the movable brackets or bearings for supporting the cutter and matrix-shafts at points between their ends. Fig. 18 is a side elevation of a frame or casting in which several shafts and rollers of the machine are journaled. Fig. 19 is a diagram illustrating a modified form of the feeding devices, as hereinafter described. Fig. 20 is a detail longitudinal section through the bearing of the cutter-shaft at one end of the machine. Fig. 21 is a detail view showing the end of one of the feed-rollers and the bearing therefor. Fig. 22 is a detail view of a device for adjustably holding the guide-strip upon the feed-table. Fig. 23 is a detail view of a clamp upon the end of the said guide-strip.

In the machine herein illustrated as embodying my invention the frame thereof is formed by two parallel end pieces or uprights, A, and a horizontal beam, A', rigidly connected at its ends with said uprights. The upper ends of the uprights A are, as shown, extended horizontally so as to form projections $a\,a'$ at the front and rear of the machine, respectively, said projections serving to support a feed-table at the front of the machine, and other operative parts, as will be hereinafter set forth.

B are the cutters or perforators, which consist each of a disk of metal brought to a thin edge and notched, as shown more plainly in Figs. 22, 23, 24, and 25. The said cutters are mounted upon a rotating shaft, C, having bearings in the free end of a hinged frame, D, which is pivotally connected at its rear end to the rear part of the machine-frame.

E are matrices, which are provided with annular grooves constructed to admit the edges of the cutter, and which are mounted upon a shaft, F, located parallel with the cutter-shaft C, and vertically below the said shaft when the latter is in position for operation, the said matrices being adjustable longitudinally upon the said shaft F, as are also the cutters B upon the shaft C, as hereinafter more particularly described. The shaft F is mounted in suitable stationary bearings at the upper ends of the end pieces, A, the said bearings, as herein shown, being formed in detached hubs or blocks $f\ f'$, provided with downwardly-projecting ears or lugs $f^2\ f^3$, secured to the standard A by means of bolts $f^4$ $f^5$, passing through said lugs and inserted in threaded apertures in the said standards.

Upon the shafts C and F, exterior to the standard A, at one end of the machine, are placed intermeshing pinions C' and F', of equal size, the lower pinion, F', intermeshing with a spur-wheel, G, located upon the upright A below the said pinion F', by which said pinions are actuated. The spur-wheel G is preferably mounted upon a spindle, $A^2$, rigidly secured to the upright A, and is driven from a pinion, H, mounted upon a spindle, $h$, similarly supported upon the upright A, and actuated from a pulley, H', over which the belt is placed, by which power is transmitted to the machine, and which, as herein shown, is connected with the pinion H by means of a suitable clutch device, $h'$.

The frame D, bearing the cutter shaft C, being hinged to the machine-frame, as before described, is adapted to swing upwardly, so as to lift the cutters clear of the grooves in the matrices and to disengage the pinion C' from the pinion F' upon the shaft F.

The purpose of mounting the cutter-shaft in the manner described is to enable the cutter-shaft to be thrown back from the matrix-shaft, and to thereby permit access to both of the shafts mentioned for the inspection and adjustment of the cutters and matrices, and also to permit the cutters to be disengaged from the matrices for the purpose of allowing the paper to pass the cutters at times without being perforated. To effect the latter object, which requires but a slight movement of the cutter-frame D, means are preferably provided herein for lifting the free end of the said frame automatically at desired intervals. It is to be understood, however, that such automatic devices for causing the disengagement of the cutters and matrices are not necessary to the operation of the other parts of the machine herein described, and the frame D may be lifted by hand for the purpose above mentioned, or by devices not operating automatically; and in machines for making continuous lines of perforations only devices for lifting the said frame may be dispensed with entirely.

As a preferred construction in the frame D, it consists of two end pieces or plates, D' and $D^2$, in which the shaft C is journaled, and which are rigidly connected by a bar, $D^3$, the rear ends of said end pieces being arranged to overlap the projections $d$ upon the machine-frame and joined therewith by means of pivot-pins $d'$.

The devices for lifting the frame D, to cause interruptions or intervals in the line of perforations, as herein shown, and as preferably constructed, consist of a series of adjustable cam-plates, G', secured to the outer face of the spur-wheel G so as to rotate therewith, and constructed by suitable intermediate connections with the frame D to lift said frame, and thereby cause the disengagement of the cutters and matrices at desired intervals.

The machine hereinbefore referred to as forming the subject of a separate application is provided with a cutter-shaft and matrix-shaft, a hinged frame for supporting the cutter-shaft, and a series of cam-plates for lifting the cutters from engagement with the matrices, the parts mentioned operating in a manner substantially similar to the corresponding parts herein illustrated and above described, and the devices above mentioned do not, therefore, in themselves form a part of the present invention.

As herein shown, the cutter-shaft C and the matrix-shaft F are provided with plain cylindrical surfaces, and the cutting-disks B and matrices E are supported upon the said shafts by means of circular plates or nuts B' and E', which are centrally apertured so as to fit upon the said shafts, and are provided with suitable clamping devices in order to enable them to be shifted upon the shafts and secured firmly thereon in any desired position.

As best shown in the accompanying drawings, Figs. 12 and 13, the cutting-disk B is constructed of a thin plate of tempered steel, and is provided with a large central circular orifice, which is fitted to the surface of a cylindric extension, $b'$, upon the plate B', and is clamped between an annular concentric shoulder, $b^2$, upon said plate and the corresponding face of a ring, $B^2$, which is threaded interiorly to fit the threaded end portion of the cylindric extension $b'$.

The matrices herein shown consist of two plates, $e$, of annular form, which are placed upon cylindric extension $e'$ upon the plate E', and clamped between faces $e^2$ and rings $E^2$, in the same manner as that described in connection with the cutters C, a thin layer, $e^5$, of paper or other material being placed between the plates composing the matrices for the purpose of keeping them separate. This construction in the means for supporting the cutters and matrices upon their shafts is substantially similar to one form of device for this purpose illustrated in the application above referred to.

The clamping device for securing the plates B' and E' to the shafts C and E, as herein shown, consists of set-screws $B^3$ and $E^3$, which are inserted in threaded apertures $b^3$ and $e^3$ in the plates B' and E', and are constructed to abut at their inner ends against split rings $B^4$ and $E^4$, located in annular grooves in the central apertures of the said plates, and constructed to embrace the shafts.

As herein shown, the screws $B^3$ and $E^3$ are provided with square heads $b^4\ e^4$, made of less diameter than and located within the apertures $b^3$ and $e^3$.

The plate B' and the clamping-ring $B^2$ are preferably provided with annular flanges or projections $b^5\ b^6$, extending beyond the cylindric surface of the said plate and ring, so as to increase the width of the adjacent annular bearing-faces in contact with the cutter.

In the circular notched cutters heretofore used in connection with opposing grooved matrices in perforating-machines, the edges of the cutters have usually been ground to a sharp or cutting edge for the purpose of severing the paper along the line of perforations, as illustrated, for instance, in the application above referred to.

A great objection to cutters having a sharp edge is that it is difficult, if not practically impossible, to grind or otherwise reduce the periphery of such cutters to a sharp edge and still preserve a circular form therein; and though this may be done with sufficient exactness in first making the cutters, any after sharpening thereof will not only tend to make them irregular in form, but will reduce their diameter, so as to make them unfit for use, or to render necessary a considerable and troublesome readjustment of the machine. Such sharpened edges also have the disadvantage of being easily injured or crushed down by accidental contact with any hard substance, such injury being especially liable to occur in machines of the character herein described, if the hinged frame supporting the cutter-shaft is accidentally or otherwise thrown into position for operation when the cutters are not in exact adjustment with reference to the grooves of the matrices.

Any injury to the edge of the cutters arising in the manner described will obviously result, when the cutter is resharpened, in lessening the radius of the cutting-edge either in the whole or in a part of the circumference of the cutter.

To obviate the above-mentioned and other objections to cutters constructed as above described, I employ a circular cutter, which, instead of being sharpened to a knife-edge, is made exceedingly thin at its periphery, so as to form a series of exceedingly narrow annularly-arranged surfaces at the edge of the disk, having obtuse cutting-edges at their intersection with the beveled sides of the cutter, as clearly shown in the enlarged section Fig. 15. The edge of the cutter, when constructed in this manner, is in practice preferably made of a thickness equal to from two to five thousandths of an inch, and may be formed by beveling the edges of a cutter of ordinary thickness, as in the form of cutter shown in Figs. 14 and 15 of the accompanying drawings, Fig. 14 being a fragmentary view, much enlarged, of the periphery of the cutter, and Fig. 15 a section, also greatly enlarged, through the portion of the cutter adjacent to its edge and the opposing grooved matrix. The same effect may, however, be produced by making the cutter of a thin plate—say of from four to six thousandths of an inch in thickness—said plate being held between annular clamping plates or rings extending outwardly to within a short distance of the margin of the disk, as illustrated in Fig. 15$^a$.

The beveled cutters with a narrow cylindric edge, such as above described, are found to act with perfect success in severing the paper so as to form a series of perforations, and operate without detaching any considerable part of the material operated upon, the portion of material removed being in practice limited to a few particles or shreds of fiber.

The beveled cutter B (shown in Fig. 15) presents a form which I have found efficient in practice, and in which the body of the plate is made of thickness approximating twelve-thousandths of an inch, and the edge of the cutter two or three thousandths, the edge being beveled outwardly from the margins of the opposing plates B′ and B² of the holder.

The grooved matrix illustrated in connection with the form of the cutter shown in Fig. 15 is substantially similar to the one illustrated in the application above referred to. The groove of the said matrix is preferably made of slightly greater width than the edge of the cutter, so as to permit its free entrance thereto, and is usually of less width than the body of the disk composing the cutter. A desirable width for the groove I find to be about five-thousandths of an inch, so that when the cutter is inserted into said groove about half the depth of the beveled portion the sides of the groove and cutter will come in contact. The principal object of this construction is to facilitate the operation of adjusting the relative position of the cutters and matrices upon the shaft supporting the same. In such operation either the cutter or matrix is first secured in the desired position upon its shaft, and the cutter and matrix are then brought together, so as to cause the cutter to enter the matrix until its beveled portion comes in contact with the sides of the groove, when the part which is loose is also secured in place.

The matrix and cutter in the operation described will be obviously brought into the exact position necessary for perfect operation by the action of the beveled edge of the cutter upon the sides of the groove, such position being one in which the edge of the cutter will enter the groove in the matrix at an equal distance from both sides thereof.

The thickness of the edge of the cutter and the width of the groove which it enters are usually so proportioned with reference to the thickness of the sheet of paper operated upon that the edge of the cutter will have no tendency to bend or double the edges of the paper down into the groove, although the paper is unsupported at the point at which said edge enters the paper, which is at the center of the groove. This condition is illustrated in Fig. 15, in which the sheet of paper being operated upon is indicated by $e^6$, the edge of the cutter, as shown in said figure, having punctured the paper, and then pressed it aside in its further entrance.

When the plates $e$ composing the matrices are made flexible, so as to permit their separation upon the entrance of the beveled cutter, as described and claimed in the application above referred to, the groove formed by the said plates when they are in their normal position need be only of slightly greater width than the tangible edge of the cutter, said plates being forced apart after the edge of the cutter has passed between them until it has entered to its full depth.

In order to enable the cutters to be placed upon and taken from the shaft C, the bearing $d^2$ at the end of the said shaft opposite to that to which the pinion C' is attached is preferably formed in a part or block, $D^4$, made separate from and detachably connected with the end plate, $D^2$, of the hinged frame D, as shown more clearly in Figs. 1 and 20.

The block $D^4$ is, as herein shown and illustrated more clearly in Fig. 20, provided with two steadying-pins, $d^3$, which fit in corresponding apertures in the cross-bar $D^3$ at a point adjacent to the end of said bar, and is held in place by a bolt, $d^4$, inserted through the said cross-bar and into the said block.

The end of the shaft C and the aperture in the hub $d^2$ are preferably made cylindrical, so as to permit an end movement of the shaft in the bearing when the shaft is caused to expand or contract by changes in the temperature, the opposite end of the shaft upon which the pinion C' is placed being held from end movement in the bearing $d^5$ by means of a collar, $c$, Fig. 1, secured to said shaft against the inner face of the arm D', and operating in connection with the pinion C', which is rigidly secured to the end of said shaft and bears against the outer end of the hub.

The end of the shaft F upon which the pinion F' is placed is held from end movement by means of a collar, $f^6$, placed in contact with the inner face of the hub $f$, and the opposite end of said shaft is left free to slide longitudinally in the bearing $f'$, as before described in connection with the shaft C.

The bearing $f'$ being detachably connected with the machine-frame, as before described, said bearing may obviously be removed, so as to permit the matrices to be slipped over the end of the shaft in placing them upon and removing them from said shaft in the same manner that the cutters are removed from and placed upon the shaft C.

The pinions C' and F' are, as herein shown, and best seen in Fig. 4 of the drawings, held upon the shafts C and F by means of nuts $c^3$ and $f^7$, constructed to clamp said pinions against suitable shoulders formed by reducing the size of the parts of the shafts upon which the pinions are placed, suitable jam-nuts being, as shown, placed upon the ends of the shafts, outside of the nuts mentioned, to hold them firmly in place.

For the purpose of holding the shafts C and F from longitudinal movement, and to retain the cutters and matrices accurately in proper relative position when they are brought together, notwithstanding any play or looseness in the connections of the hinged frame D the bearing $f$ of the shaft F is preferably provided with an upwardly-extending projection, $f^8$, which is constructed to enter a corresponding recess, $d^6$, in the bearing $d^5$ of the shaft C, as shown in Fig. 4. The sides of the projection $f^8$ and recess $d^6$ are accurately fitted to each other, and the said projections, and recesses are so arranged that they come into engagement when the frame D is thrown into operative position before the cutters enter the grooves of the matrices, so that contact of the cutters and matrices will be prevented unless they are in position for proper engagement.

In perforating-machines as heretofore constructed the cutter and matrix shafts have each been provided with a collar, one having an annular groove and the other an annular rib adapted for engagement with the groove, so as to hold the shafts from relative longitudinal movement.

By providing the machine-frame and the hinged frame D with a projection and recess, $f^8$ and $d^6$, and providing the shafts with suitable shoulders or collars for holding them from end movement in their bearings, I am enabled to accomplish the same result with a more simple construction in the parts, and at the same time to avoid the objectionable frictional resistance due to the contact of the surfaces of the annular rib and groove.

As an improved means of feeding the paper to the cutters, devices are herein shown which are constructed as follows: At a point in advance of the cutters and matrices is located a feed-roller, I, which may be rotated by any suitable gearing from the spur-wheel G, or other operative part of the machine, but, which, as herein shown, is actuated by means of a spur-gear, I', upon the end of the said roller, which meshes with an idler, $I^2$, mounted upon the machine-frame and driven from a spur-wheel, $F^2$, upon the shaft F. The roller I is preferably constructed to operate in connection with two upper feed-rollers, J and J', preferably made of considerably less size than the said roller I, and located above the latter roller and somewhat distant from each other. The rollers J and J' are preferably provided with a series of flexible belts, $j$, passing around said rollers and resting against the roller I, the roller J' being, as herein shown, actuated by a pinion, $j'$, upon its end, which meshes with the spur-gear I' upon the roller I, and the roller J being driven by means of the bands $j$ from the said roller J'. The roller I is preferably, but not necessarily, located with its upper surface considerably above a horizontal plane passing through the point of contact of the cutters and matrices, and the forward roller, J, of the upper feed-rollers is also preferably located vertically above the axis of the said roller I, a suitable feed-table, K, being, as herein shown, arranged with its horizontal upper surface practically in line with the meeting-point of the rollers I and J, so that the edge of a sheet of paper fed from the said table will be in position to be gripped by the rollers mentioned. The roller I is preferably provided with a series of bands, i, of rubber or other elastic or yielding material, which are arranged opposite to the belts j and act, in connection with the said belts, to firmly grip and feed forward the sheets of paper introduced between the rollers I and J. By giving a positive movement to the roller I and the belts j, and making the said belts and the opposing portions of the surface of the roller of rubber or other material which tends to grip or hold the paper, two or more sheets of paper, one on top of the other, may be fed together to the cutters. Both sheets of paper, when two sheets are fed at once, will be gripped by the feeding devices described, so as to be fed forward at equal speed, and when more than two sheets are inserted between the rollers at one time the intermediate sheet or sheets will be carried forward by contact with the upper and lower sheets. Between the roller I and the perforating devices is preferably located a bridge or guide plate, L, which is arranged to deflect the paper horizontally as it passes from between the roller I and the bands j, and as a guide to direct the forward edges of the sheets of paper horizontally to the cutters. The plate L is, as herein shown, and preferably constructed, slightly inclined downwardly and toward the rear, and its front edge is located in close proximity to the surface of the roller I at a point near the roller J', and is provided with a series of prongs or projections l, which rest upon the surface of the said roller in its portions between the bands i, and serve to deflect the advance edges of the sheets of paper from the rollers and to direct them upon the plate L. The prongs l may terminate at or near their points of contact with the roller I, or, as herein shown, they may extend over the upper portion of the said roller, between the bands i, and rest at their forward and free ends beneath the rear edge of the feed-table. When constructed in the manner last described, the prongs l serve to guide the edge of the paper as it passes from the table to the point at which it is gripped between the rollers I and J; but the same result may be accomplished by the contact of the paper with the roller I when the rear edge of the table is near or overhangs the said roller, as is the case in the machine illustrated in the drawings, and the use of the prongs for this purpose is therefore usually unnecessary.

The guide-plate L may be supported from the machine-frame in any desired manner. As herein shown, however, said plate is upheld by means of downwardly-projecting arms l', attached to said plate and bolted at their lower ends to the beam A'.

By the construction above set forth in the devices for feeding the paper to the cutters, the sheets of paper are curved or bent, first, in passing from between the roller I and bands j, and again in the opposite direction over the guide-plate L to the cutters.

A greatly improved result in the operation of the machine is obtained by preliminarily bending or flexing the paper in the manner described, the reasons for which may be briefly explained as follows:

In operating upon paper of the kind technically known as "flat" paper, or that which is perfectly flat or unwrinkled, in perforating-machines of the general character described, the sheets of paper will pass through the feed-rollers and between the cutters and matrices with equal speed at all parts, and will therefore have no tendency to twist, and the lines of perforations will usually be both parallel and straight. When the paper to be perforated is wrinkled or buckled, however, as is the case, for instance, with what is known as "bond" paper, the sheets, if fed flat to the cutters, will tend to spread laterally by the flattening out of the buckles or wrinkles therein to a variable extent in their different portions, and the cutters are thereby liable to produce, by such unequal spreading of the paper as it passes between them, converging or otherwise irregular lines of perforations.

It is a well-known fact that in bending or folding a wrinkled or wavy sheet of paper the sheet will be expanded to its full width or length upon the line of the bend or fold, so that by curving or preliminarily bending the sheets of paper without straining them or putting them under tension as they approach the cutters the latter are caused to operate upon the sheet at the time that it is expanded to its full width by such bending, and the sheets of paper being continually expanded laterally at the point at which the cutters operate upon them during their passage between the cutters and matrices, any irregularity in the movement of the paper which might otherwise be caused by the unequal lateral expansion thereof is entirely prevented.

In the devices herein shown the sheets of paper are bent twice before reaching the cutters—once in passing over the roller I, and a second time, in the opposite direction, in passing from the said roller to the cutters. This double or reverse flexure of the paper, while, perhaps, desirable and necessary in the case of a machine constructed in the manner shown, is not essential to the improved result above described in causing a regular and even movement through the machine of the sheets of paper, and means may be provided for curving the paper in one direction only as it approaches the cutters with a practically similar result.

Another device for flexing the sheets of paper, in which the latter are bent in one direction only, is illustrated in Fig. 19 of the accompanying drawings. In the figure mentioned a single upper feed-roller, J², is used which operates in opposition to an inclined plate, L', preferably shown as curved at its lower end, so as to guide the paper horizontally to the cutters.

The construction shown in the figure above mentioned presents a practicable and simple form of feeding device, which may be used in the machine shown in place of the feeding devices before described, with the disadvantage, however, that, there being but one movable part or surface in such device, one sheet of paper only can be fed by it at one time with uniformly good results.

The improved result obtained by preliminarily bending or flexing the paper is found to exist whenever the sheets are fed to the cutters in a curved form instead of being fed to them when flat, as has heretofore usually been the practice in perforating-machines. Such bending may be accomplished by a curved or other guide or guides of any well-known construction, as well as by the particular devices herein shown, and I desire to cover, in combination with suitable feed-rollers, a guide-plate constructed to cause a preliminary bend or flexure in the paper as it is fed from the said feed-rollers to the cutters and matrices, without limitation to the particular construction in the guide-plate herein shown.

In the machine before mentioned as forming the subject of another application, means, operating in connection with the automatic devices hereinbefore mentioned for lifting the cutters from engagement with the matrices, were provided for controlling the entrance of the sheets of paper to the cutters, so as to cause the breaks or interruptions in the lines of perforations caused by such lifting of the cutters to bear a desired relation to the edges of the sheets as is necessary in producing blank spaces for stubs, binding-margins, and other purposes.

As an improved construction in devices for the purposes mentioned, a vertically-movable stop or feed-gage, M, is herein shown as located above the roller I and between the rollers J and J', said stop being preferably operated by suitable connecting devices actuated by means of cam-plates $G^2$, upon the spur-wheel G. The lower edge of the gage M is constructed to fall between the rollers J and J' and near the surface of the roller I, so as to prevent the passage of the sheet of paper over said roller, and when the bands $j$ are present, as herein illustrated, said gage is provided with a series of downwardly-projecting prongs or points, $m$, arranged to pass between the said bands. The said prongs, as herein shown, are provided upon their portions which are adjacent to the roller I with strips $m'$, of felt or other yielding material, so as to prevent the roller and gage from being worn or abraded in case the parts actually come in contact, as they may do under some circumstances.

In order to prevent the paper from being forced forward against the gage M by the action of the feed-rollers when the said gage is in position to arrest the paper, the upper and forward roller, J, is supported in vertically-movable bearings, and means are provided for automatically moving the said bearings, so as to give a vibratory movement to the roller J, whereby said roller is raised when the gage is depressed, and is brought into contact with the roller I when the gage is lifted.

As a preferred construction in the devices mentioned, they are made as follows: The feed-gage M is supported at either end by being attached to the ends of the arms M', fixed to the shaft $M^2$, which is mounted at its ends in suitable bearings formed in plates $M^3$, bolted to the forwardly-projecting portions $a$ of the standard A, as shown more clearly in Fig. 2. The roller J is mounted at its ends in suitable bearings upon the extremities of the arms $J^2$, located in a horizontal position below the arms M', and connected by means of pivot-pins $j^2$ to the plates $M^3$ at a point considerably in advance of the shaft $M^2$. The arms M' are provided with horizontal extensions or arms $m^2$, which are connected with the arms $J^2$ at a point between the rollers J and the pivot-pins $j^2$ by means of short pitmen or connecting-links $m^3$, pivotally connected with the arms $m^2$ and $J^2$, respectively.

In the construction above described, which is more clearly shown in Fig. 5, it is obvious that when the feed-gage M is depressed by the downward movement of the extremities of the arms M' the arms $m^2$ will be lifted, and the arms $J^2$, being connected with the said arms $m^2$, will be swung upwardly about their pivotal points, and the roller J will be thereby raised from contact with the roller I.

The feed-gage M may be actuated in any desired manner or by means of any suitable connecting mechanism from the cam-plates $G^2$. As a preferred construction in devices for this purpose, the arms M', carrying the feed-gage, are, as herein shown, rigidly connected with the shaft $M^2$, and said shaft is extended beyond its bearings in the plates $M^3$, at the side of the machine adjacent to the spur-wheel G, and upon the end of the said shaft is rigidly secured a downwardly-projecting lever or arm, $M^4$, the lower end of which is located in position to engage the bearing-surface $g^2$ of the cam-plate $G^2$.

The arm $M^4$ is so located with reference to the arms M' that when the feed-gage is at the upper limit of its movement the lower extremity of the said arm $M^4$ will be swung inwardly toward the axis of the wheel G in the path of the cam-plate $G^2$, and when the said cam-plate is brought in contact with said arm by the rotation of the wheel G said arm will be thrown outwardly and the feed-gage depressed.

The arms M', which support the feed-gage, and the arm $M^4$ are, as herein shown, secured to the shaft $M^2$ by means of set-screws, so that their angular position with reference to each other may be adjusted as found necessary or desirable.

As an improved construction in devices for supporting the hinged frame D, and for actuating said frame from the cam-plates G', such devices are constructed as follows: In the forwardly-projecting portion $a$ of the uprights A is mounted a shaft, P, to the ends of which, exterior to the standard, are rigidly secured rearwardly-projecting arms P' and P². The arm P' is located at the end of the machine, adjacent to the spur-wheel G, and preferably extends rearwardly between the upper portion of the said spur-wheel and the standard, and has near its end a pin, $p^2$, which projects laterally from the arm over the spur-wheel G in position to engage the cam-plates G'. and is preferably provided with an anti-friction roller, $p^3$. The arms P' and P² are connected with the free end of the frame D by means of vertical bars P³, said bars being preferably connected with the said frame by means of pivot-pins $p'$, and constructed to rest at their lower ends in notches $p^4$, formed in the upper ends of the arms P' and P², the object of this construction being to permit the disengagement of the said bars P³ from the said arms when the frame D is thrown upward for the purpose of inspecting or adjusting the cutters or matrices. The notches $p^4$ are, as herein shown, preferably constructed of V shape, and the lower ends of the bars P³, which rest in said notches, are preferably made with knife-edges, so as to lessen the area of the surfaces in frictional contact. The desired vertical motion may obviously be given to the frame D by means of the cam-plates acting upon the single arm P', connected with one end of the frame D through the medium of the connecting-bars P³, and the shaft P and the arm P² at the opposite end of the machine may therefore be dispensed with. In order, however, to provide a construction by which the ends of the frame may be lifted to precisely the same extent without making the said frame of undue weight, in order to produce the requisite rigidity therein, the two arms P' and P² are preferably used, said arms being rigidly connected by the shaft P, and operating to lift the frame an equal distance at both ends, and to thereby prevent any twisting or torsional strain upon the connecting-bar D³ of the frame D. The free end of the cutter-frame D is supported when in its normal position by means of adjusting-screws D⁵, inserted through the front end of the side plates, D', of said frame, and constructed to rest at their lower ends upon the upper edge of the casting A, said screw being for the purpose of adjusting the relative vertical position of the cutters and matrices as may be desired.

In order to permit the arms P' and P² to be adjusted to correspond with the vertical adjustment of the frame D, accomplished by the screws D⁵, the pin $p^2$, instead of being mounted directly upon the arm P', may be fixed in a separate block, P⁴, secured upon and vertically adjustable with reference to the free end of the arm P'.

As a preferable construction in the block P⁴, it is pivoted at one end of the arm P', as shown more clearly in Fig. 6, and its free end is provided with a set-screw, $p^5$, which passes through the said block and abuts against a part of the arm P'.

As preferably constructed, the movable block P⁴ is pivoted to the arm P' at some distance from the end of the latter, and the set-screw $p^5$ in its free end is constructed to bear upward against the rearwardly-extended portion $p^6$ of the said arm P'.

In addition to the set of four cam-plates, G', which are herein shown as pivotally connected with the hub $g$ of the wheel G, and which operate in a manner substantially similar to the cam-plates shown in the application above referred to, one or more additional cam plates, G³, are herein shown as similarly pivoted upon the hub $g$ of the wheel G, said cam-plates G³ having relatively short bearing-faces $g^3$. The object of the second set of cam-plates, G³, is to enable breaks or skips to be made in the line of perforations much shorter than those obtained by the operation of the bearing-face $g'$ of one of the plates G', the bearing faces of the said plates G', when four are used, as herein shown, usually being constructed to extend through an arc approximating a quarter of a circle, so that the said plates, when placed at equal distances apart, will form a bearing-surface extending nearly or entirely around the wheel, and thereby enable the cutters to be held out of engagement with the matrices through the entire rotation of the said wheel G, or the greater part thereof.

The plates G' and G³, when constructed as above described, may be placed so as to produce any desired number of skips or blank spaces in the lines of perforation upon a sheet of paper, and the skips may be made of any desired length by placing two or more plates together and overlapping them, so as to make a continuous bearing-surface for the pin $p^2$.

The cam-plates G², before mentioned as being attached to the spur-wheel G and constructed to operate the feed-gage M, also operate in a manner substantially similar to the corresponding plates described in the application above referred to, and are adjustably mounted upon the hub $g$, so that they may be placed in any position with reference to the cam-plates G' and G³ as is found necessary in order to cause the limits of the skips in the lines of perforations to bear the desired relation to the advance edges of the sheets.

In order to provide a convenient means for adjusting the cam-plates G', G², and G³ with reference to each other for the purposes above mentioned, the said spur-wheel is provided upon its marginal portion with a scale or index, G⁴, preferably marked upon the face of said wheel, adjacent to the said cam-plates, and numbered to indicate units of length, the scale herein shown being a scale of inches. As herein shown, also, the spur-wheel G is constructed to mesh with the pinion F', which is made of the same diameter as the pinion C' upon the cutter-shaft, both of said pinions being of the same diameter at their pitch-lines as the cutters and matrices, so that the periphery of the said spur-wheel moves with the same speed as the paper as it passes the cutters. It follows, therefore, that when the machine is in operation the movement of a point upon the periphery of the spur-wheel through a certain distance will produce a corresponding forward movement in the paper passing between the cutters, so that if the curved bearing-faces of the cam-plates, which are approximately of the same radius as the pitch-line of the spur-wheel G, are so arranged as to extend through an arc measuring, for instance, five inches upon the scale, the paper will be caused to pass the cutters without being perforated for a corresponding space of five inches.

The cam-plates $G^2$, which operate the stop mechanism or feed-gage for controlling the entrance of the sheets of paper to the cutters, are preferably so located with reference to the zero-mark of the scale $G^4$ that the advance edge of the paper will reach the cutters at the moment that the said zero-mark reaches the pin $p^2$. The plates being thus adjusted, if it is desired to begin the line of perforations at a distance from the edge of the paper of, for instance, three inches, one of the cam-plates $G'$ is placed with its advance edge at a point of the scale indicating three inches, so that the said cam-plates will hold the cutters from contact with the paper at the time it begins to pass between the cutters and matrices and until it has moved three inches, when the roller $p$ will pass from said cam-plate $G'$, and the cutters will begin to perforate. If from the beginning of such line of perforations it is desired to continue the perforations for, say, two inches and a half, one end of the bearing-faces of one of the cam-plates—as, for instance, one of the plates $G^3$, Fig. 10—is placed at a distance of two inches and a half, as indicated upon the scale, from the figure 3, or at a distance of five and one-half inches from the zero-point, and the pin $p^2$ will obviously be lifted by the said cam-plate and the cutters cease to perforate at such point.

By the use of the scale $G^4$, in combination with the several cam-plates, as above described, it is obvious that the said cam-plates may be quickly adjusted to the exact position required in producing skips or intervals in the line of perforation of any length and in any position with reference to the edges of the sheet desired, such adjustment being accomplished without the necessity of preliminary trial and repeated adjustment in order to make the skips of the right length or to bring them in the required position upon the sheet.

In case it is desired to perforate through a short space only upon each sheet, the plates $G'$ and $G^3$ will obviously be so disposed around the circumference of the wheel G as to support the pin $p^2$ in its elevated position at all points, excepting through the short space at which it is desired to perforate the paper.

It is obviously unessential that the cam-plates $G^2$ should be so located as to cause the edge of the paper to reach the cutters at the moment the pin $p^2$ reaches the zero-point of the scale, as above described, for the reason that the paper may begin its movement at any time in the rotation of the said wheel G, it only being necessary in adjusting the cam-plates $G'$ and $G^3$, when the cam-plates $G^2$ are not arranged as above described, to note the position of the roller with reference to the scale at the moment the paper starts into the machine or reaches the cutters, and then to place the said cam-plates $G'$ and $G^2$ at the desired distance or distances from the point upon the scale so noted.

The spur-wheel G is usually made somewhat greater in circumference than the length of the sheets of paper to be operated upon, so that after the passage of one sheet of paper beneath the feed-gage the latter may be operated by the cam-plate $G^2$ in time to arrest a following sheet. A sheet of paper equaling in length the circumference of the wheel G may, however, be perforated upon the machine described, it having been found in practice that the descent of the feed-gage upon a sheet passing beneath it will not arrest the motion of such sheet, but that the gage will, in such case, stop a succeeding sheet laid over the first until the first sheet has passed, when the gage may be lifted so as to allow the second sheet to closely follow the one first inserted.

As herein illustrated, the scale $G^4$ is not extended entirely around the circumference of the wheel G, but terminates a short distance from the zero-point, and the cam-plate $G^2$ is arranged in such manner that the feed-gage actuated thereby will be thrown downwardly after the pin $p^2$ has passed the end of the scale, and will remain in position to arrest the sheet of paper following that which has been operated upon until the zero-point of the scale reaches the pin $p^2$, at which time—or some time before or after, according to the exact position in which the cam-plate $G^2$ is placed—the gage will be lifted and the paper permitted to advance to the cutters. In case the plates $G^2$ are so adjusted that the zero-point will reach the pin $p^2$ at the moment the advance edge of the paper reaches the cutters, it is obviously necessary that the said feed-gage should be lifted at a sufficient distance in advance of the zero-point of the scale to enable the edge of the paper to traverse the distance between the said feed-gage and the cutters; and as the paper is fed at the same speed at which the bearing-edges of the cams move, the actual distance between the said feed-gage and the cutters upon the line taken by the paper will be the distance in advance of the zero-point at which the plates $G^2$ must be placed in order to lift the said feed-gage for the purpose above mentioned.

In Figs. 1, 2, and 4, the cam-plates G' and G³ are shown as provided with central circular apertures, which are fitted to a cylindrical surface, $g^4$, of the hub $g$ upon the wheel G, adjacent to the outer face thereof, the said cam-plates being held in any desired position by means of a bolt, G⁵, inserted through concentric slots $g^5$ in the said plates and tapped into the face of the said wheel. The plates G², as shown in said figures, are mounted upon a cylindrical part, $g^6$, of said hub $g$, said surface being of less diameter than the projections $g^4$, upon which the plates G' and G³ are placed, so as to form a shoulder against which the said plates G² may rest, the latter plates being held upon the hub by means of a plate or ring, G⁶, which is shown as interiorly threaded and placed upon the correspondingly threaded end portion of the hub, and held from movement by a set-screw, $g^7$, inserted in an aperture formed partially in said plate and partially in the hub, the plates G² being held in a desired position by means of a set-screw, $g^8$, inserted through the said collar G⁶, and bearing at its end against the said plates G².

As illustrated in Figs. 1, 2, and 4, two cam-plates, G², are shown, two of said plates being used in order to permit the time to be varied during which the feed-gage M is held in position to arrest the movement of the paper. The use of two plates G² is not, however, usually necessary, and in Figs. 10 and 11, in which another form for the devices for attaching the cam-plates to the wheel G is shown, but one of the said plates is illustrated. As shown in said figures, the cam-plate G² is constructed to rotate upon a cylindrical bearing-surface, $g^9$, upon the hub $g$ of the wheel G, and is placed in contact with the surface of the said wheel. The wheel G, as also shown in said figures, is provided with a concentric curved slot, G⁷, and a set-screw, $g^{10}$, is inserted through the said slot, and is tapped into the plate G², whereby the plate may be adjusted to a desired position and secured firmly in place when adjusted.

The plates G' and G³ are, in the figures above referred to, provided with circular apertures adapted to fit over a cylindrical surface, $g^{11}$, of the hub $g$, and are held thereon by means of a ring, G⁸, which is interiorly threaded to fit the threaded end of the hub $g$, and is provided with set-screws $g^{12}$, constructed to bear against said plates so as to hold them in position.

For the purpose of stripping the paper from the cutters C a series of plates, N, are arranged at the rear of said cutters, above the sheet of paper being perforated, said plates being provided with narrow slots forming prongs $n$, between which prongs the edges of the cutters run. The plates N are secured to clamps N', by which they are held upon the bar D³ of the hinged frame D, and operate in a manner substantially similar to the corresponding plates described in the application above referred to.

As an improved means of adjustably securing the said plates N to the bar D³, the said bar is provided, preferably upon its lower edge, with a longitudinal groove, $d^7$, and the clamps N' are provided with projections $n'$, constructed to enter the said groove.

The clamps N' are preferably provided with thumb-screws $n^2$, constructed to bear against the upper edge of the bar D³, so as to hold the projections $n'$ within the groove $d^7$, and to thereby retain the plates N firmly in a desired position with reference to the cutters.

At the rear of the cutters and matrices in the machine herein shown are preferably located two rollers, O and O', which are for the purpose of drawing forward the sheets of paper after they have passed the cutters, and which are also constructed, as herein shown, to press down or smooth the paper upon the lines of perforations. The lower roller, O, is preferably made of considerably greater diameter than the roller O', and is driven from the pinion F² upon the matrix-shaft by means of a spur-wheel, O², actuated by an idler, O³, mounted upon the machine-frame and intermeshing with the said pinion and gear-wheel, as best seen in Fig. 5, the roller O being of approximately the same diameter as the cutters and matrices, as clearly shown in Fig. 3, and the spur-wheel O² being smaller in diameter than the pinion F², as shown in Fig. 5, so that the surface of the said roller O is driven slightly faster than the peripheries of the cutters and matrices. The upper roller, O', is preferably mounted to rotate freely in bearings permitting a free vertical movement thereof, and rests upon and is rotated by the roller O. By this construction the sheets of paper will obviously be permitted to slip upon the driven roller O as they pass between the rollers, and the surface of the said roller O being driven faster than the speed of the cutters at their line of engagement with the paper, the latter will obviously be constantly drawn away from the cutters with a gentle tension, whereby the forward feed of the paper will be controlled entirely by the movement of the cutters, and the feed-rollers O O' will thereby be prevented from drawing the paper more rapidly at one place than at another, so as to cause a change of direction therein and the consequent production of crooked lines of perforations.

For the purpose of removing the irregularities or roughness in the paper at the lines of perforations, the roller O is herein shown as provided with a series of narrow bands, $o$, of rubber or other yielding material, said bands being arranged opposite the cutters, so as to press upon and smooth the paper upon the said lines of perforations.

In the drawings, Fig. 1, only one band, $o$, is shown; but any number may of course be used, corresponding in number with the cutters.

The end bearings for the several feed-rollers I, J', O, and O', instead of being formed in or supported separately by the main frame of the machine, may be made in a separate casting or plates, Q and Q', which, as herein shown, and illustrated more clearly in Figs. 1, 3, 4, 5, and 18, are secured to the inner faces of the uprights A of the machine-frame.

The plate Q' at the end of the machine adjacent to the driving-wheel G is, as shown in Figs. 5 and 18, provided with projections or hubs $q$, in which the bearing-pins of the idlers $I^2$ and $O^3$ are fixed.

The plates Q and Q' are, as herein shown, provided with apertures $q'$, Fig. 18, through which apertures headed bolts $q^2$, Fig. 3, for securing them to the uprights A are inserted.

Bearings $q^3$ and $q^4$ for the feed-rollers I and O, respectively, are, as herein shown, formed in the front and rear portions of the plates Q and Q', said bearings being provided with removable caps $q^5$ and $q^6$, so that the rollers may be removed therefrom when desired.

The bearings $q^7$ for the roller O' are preferably formed in upwardly-extending portions $Q^2$ of the cover $q^6$ of the bearing $q^4$, and are provided with a vertical slot, $q^8$, open at its upper end, in which the ends of the said roller O' rest, and in which they are free to move vertically, for the purpose before stated.

The bearings for the feed-roller J' are preferably formed in hubs $q^9$ upon the ends of upwardly-extending arms $Q^3$ of the plates Q and Q', the hub at one end of the roller being provided with a cylindrical aperture to receive an ordinary cylindrical bearing-pin upon the end of the roller, and the hub at the opposite end, as shown in Fig. 21, being provided with a centrally-apertured screw-plug, $Q^4$, provided with a transverse slot, $q^{10}$, by which it may be rotated for the purpose of adjusting or removing it.

The roller J', as shown in Fig. 21, is reduced in size near its end adjacent to the plug $Q^4$, as indicated at $j^3$, the reduced portion being of less diameter than the said plug, so that when the latter is removed the roller may be shifted endwise until its opposite end is free from the hub in which it is supported, when the entire roller can be taken from the machine.

When the cutter and matrix shafts are of considerable length, as in the present instance, movable dogs R and R' (shown in Figs. 16 and 17) may be attached to the stationary parts of the machine-frame, and constructed to embrace the shafts, so as to support them from lateral movement in their central portions.

The dog R, Fig. 16, for supporting the shaft C, is herein shown as being clamped to the cross-bar $D^3$ of the hinged frame D, and is recessed at its lower end to receive a centrally-apertured bearing-block, $R^2$, which is fitted to the shaft and held in place in the said recess by means of a set-screw, $r$.

The shaft F, as shown in Fig. 17, may be similarly supported by a dog, R', secured to the stationary cross-piece A' of the machine-frame by a suitable clamping device, and recessed to receive a bearing-block, $R^3$, upon the shaft F, said bearing-block being held in place by a set-screw, $r'$, in the manner before described.

By connecting the dogs R and R' with the shafts by means of separate bearing-blocks, as above set forth, the important advantage is obtained that the said shafts are thereby held from lateral motion in all directions, and the said dogs may at the same time be readily shifted or removed in adjusting the machine or in putting cutters or matrices on the shafts.

The feed-table K may be constructed in any desired or preferred manner. As herein shown, however, it is arranged horizontally with its upper surface approximately in the same horizontal plane with the upper surface of the feed-roller I, and is supported at its inner edge by brackets K', provided with downwardly-projecting portions, $k'$, which are bolted to the parts $a$ of the standards A of the machine-frame, and at its front or outer edge by brace-rods $k$, secured at their lower ends to the said standards A, as shown.

As an improved construction in means for guiding the lateral margins of the sheets of paper as they are fed into the machine so as to cause the lines of perforations to bear the desired relation to the said margins, devices are herein provided as follows: The table K is, as herein shown, provided with an adjustable guide-strip, S, preferably provided with a sheet-metal extension or wing, S', constructed to rest upon the surface of the table. The said guide-strip S is, as also herein shown, adjustably held at its end adjacent to the rear of the table by means of an arm, T, having sliding connection with the rock-shaft $M^2$, by which the feed-gage M is supported and actuated, but which may be similarly connected with a separate horizontal shaft located above the table, near the rear edge thereof, said arm being in the present instance connected with the shaft $M^2$ merely as a matter of convenience, and to avoid the necessity for a second parallel shaft or guide-bar for holding the guide-strip. The shaft $M^2$ having an oscillatory movement, before described, the means for connecting the arm T to said shaft are constructed to permit such oscillatory movement without movement in the said arm. In the device for this purpose herein shown, and which is illustrated more clearly in Fig. 22, the arm T is connected with a horizontal bar, T', located above the shaft $M^2$, and having downturned end portions, $t$, constructed to encircle the shaft and adapted to slide and rotate freely thereon. Upon the shaft $M^2$, at one end of the bar T', is placed a sliding block or sleeve, $T^2$, provided with a projecting portion, $t'$, having a notch, $t^2$, arranged to engage one of the projections $t$ of the bar T', the said block being also provided with a set-screw, $t^3$, whereby it may be rigidly secured to the shaft $M^2$. The projection $t$ engaged with the notch $t^2$ is constructed to slide freely therein, so that when the block $T^2$ is secured to the shaft $M^2$, so as to partake of the oscillatory movement of the shaft, such oscillatory movement will not be transmitted to the bar T'.

It often occurs that in perforating paper with machines of the character described the lines of perforation desired are not parallel with the edges of the paper—as, for instance, when the paper is untrimmed, or when the lines of perforation are to bear a certain relation to printed matter in which the lines or columns are not parallel with the edges of the sheet. In the cases above mentioned it is desirable to incline the guides by which the sheets are directed into the machine so as to cause the lines of perforation to take the exact direction and position desired. For this purpose the guide-strip S may be connected with the arm T by means of a pivot-pin, $s$, suitable means being provided for adjustably holding the said guide-strip in any desired position. As herein shown, such devices consist of a thumb-screw, $s'$, inserted through a transverse slot, $t^1$, in the end of the arm T, and fitted into a threaded aperture in the strip S, the slot $t'$ being concentric with the pivot-pin $s$.

It may sometimes be found that in tables of considerable width the strip S cannot be advantageously held with sufficient rigidity by the devices before described, and as an additional means of holding the said strip its outer end, adjacent to the front edge of the table K, may be provided with a bent arm, $S^2$, extending around the edge of the table, and provided with a thumb-screw, $s^2$, constructed to bear upwardly against the lower surface of the table, so as to clamp the end of the guide S firmly against the upper surface thereof.

In order to provide means for feeding two sheets of paper from the table at the same time, and also to form a second guide for operation in connection with the guide-strip S, for the purpose of guiding both sides of a sheet of paper, a second guide-strip, $S^3$, is shown in Fig. 1 of the accompanying drawings as being located at the right-hand side of the feed-table K. The said guide-strip $S^3$ is herein shown as connected with the shaft $M^2$ by means of an arm, $T^3$, pivotally connected with said guide-strip, and having attachment to the said shaft in a manner similar to that described in connection with the arm T of the guide-strip S.

The guide-strip $S^3$ is, as herein shown, provided with laterally-projecting sheet-metal strips or wings $S^4 S^5$, extending upon either side thereof, and it is also provided at its end with a clamp, $S^6$, similar to the clamp $S^2$, before described.

In order to enable the guide-strip S to be placed in a desired position in operating upon sheets of paper of different widths, the surface of the feed-table K may be provided with a scale, U, marked with units of length, part of the dividing-lines of the scale, as $u$, being extended entirely across the table, so as to afford a guide by which the strips S and $S^3$ may be accurately set in position.

The machine herein illustrated is provided at the rear with a receptacle, V, constructed to receive the sheets of paper passing from the cutters, and which is illustrated in Figs. 8 and 9 in position for use, and in Fig. 3 when folded down and out of the way. Said receptacle is, when arranged for use, placed in an inclined position, as shown more clearly in Figs. 8 and 9, and is made approximately the full width of the machine at its upper end, and has its side margins upwardly and inwardly curved as they approach its lower end, so as to form side walls, V', which gradually increase in height and depth from the upper to the lower end thereof. Said receptacle may be provided with a stationary transverse plate or bottom at its lower end; but, as herein shown, is made open at its lower end, and is provided with a transverse plate or stop, W, which is made adjustable to correspond with the size of the sheets of paper entering the receptacle.

The purpose of the construction described in the said receptacle V is to curve or bend upwardly the edges of the sheets of paper as they slide downwardly upon the surface of the receptacle, it having been found that when sheets are thus curved or bent they will slide more readily upon each other than when they are flat, so that each sheet as it falls into the receptacle will tend to slide over the sheets already therein until arrested by the stop W. As each succeeding sheet in the operation of the device in this manner falls to and rests upon the stop W, it is obvious that the lower edges of the several sheets will arrange themselves evenly, so that when the sheets are taken from the receptacle they will be evenly placed or piled with reference to two of their edges, and approximately so with reference to the edges which are at the sides of the receptacle, the curved form of the receptacle described tending to guide the sheets in their descent in such manner as to arrange them centrally at the lower end of the receptacle. The support or stop W is preferably connected with the receptacle by means of a central threaded bolt, $w$, passing through a longitudinal slot, $v$, in the receptacle, and provided with a thumb-nut, W', whereby the said stop may be moved and clamped in a desired position. The sides V' of the receptacle being arranged to converge as they approach the lower end thereof, the stop W is preferably so constructed that it may be varied in width to correspond with the distance between the side walls of the receptacle at the point at which it is secured. For this purpose the said stop, as herein shown, is provided with a central stationary part, $W^2$, which is secured to the bolt $w$, and is provided at its opposite edges with guide-grooves $w'$, in which are held two sliding plates, $W^3$, preferably arranged to overlap each other when thrust inward. The said plates $W^3$ are preferably curved at their ends, so as to approximately fit the curved sides V' of the receptacle, and are made of sufficient length to extend substantially the entire width of the upper part of the receptacle when in their extended position.

As a desirable construction in the receptacle V, it is, as herein shown, formed of sheet metal and supported upon a frame consisting of a cross-piece, V², and a central longitudinal piece, V³, attached at its upper end to the middle of the said cross-piece, the metal composing the receptacle being secured at its upper edge to the cross-piece V², and also to the piece V³, in which the slot $v$ is preferably formed. The edges of the lower curved end of the receptacle may be additionally supported, if found necessary, by a curved metal strip, $v'$, secured to the lower end of the piece V³, and by strips $v^2$, attached at their ends to the strip $v'$, and the cross-piece V².

In order to permit the receptacle V to be folded down out of the way when not in use, said receptacle is, as herein shown, attached at its upper end by hinged connections $v^3$ to the cross-piece A' of the machine-frame, and is provided at its lower end with a folding leg, V⁴, to support said receptacle in its inclined position.

I claim as my invention—

1. The combination, with a grooved matrix, of a disk having a narrow peripheral surface forming its cutting-edge, as distinguished from being sharpened or beveled to an acute edge, substantially as and for the purpose set forth.

2. The combination, with a grooved matrix, of a disk beveled at its margin and having a narrow peripheral surface forming, with the beveled surfaces of the disk, two obtuse cutting-edges, substantially as and for the purpose set forth.

3. The combination, with a disk beveled at its margin and having a narrow peripheral surface forming its cutting-edge, of a matrix having a groove of a width greater than the thickness of the said cutting-edge and less than the thickness of the body of the disk, substantially as and for the purpose set forth.

4. The combination, with the cutters and matrices of a perforating-machine and feed-rollers for the paper, of a guide-plate located between the said rollers and the cutters and matrices constructed to preliminarily bend or curve the paper without straining it as it is fed to the said cutters, substantially as and for the purpose set forth.

5. The combination, with the cutters and matrices of a perforating-machine, of a feed-roller, I, located with its upper surface above a horizontal plane passing through the meeting point of the cutters and matrices, two laterally-separated rollers, J and J', opposed to the feed-roller I, for retaining the paper in contact with the said feed-roller, and a guide-plate constructed to direct the paper from the said roller I to the cutters, substantially as and for the purpose set forth.

6. The combination, with the cutters and matrices of a perforating-machine, of a feed-roller, I, laterally-separated rollers J and J', opposed to said roller I, flexible bands $j$, placed over said rollers J and J' and in contact with the roller I, and a guide-plate, L, constructed to direct the paper from the said roller I to the cutters, substantially as described.

7. The combination, with the cutters and matrices of a perforating-machine, of a feed-roller, I, laterally-separated rollers J and J', opposed to said roller I, flexible bands $j$, placed over said rollers J and J' in contact with the roller I, and bands $i$, of elastic material, placed around the said roller I beneath the bands $j$, substantially as and for the purpose set forth.

8. The combination, with the cutters and matrices of a perforating-machine, of a feed-roller, I, an opposing feed-roller, J', a series of bands, $i$, upon the said roller I, and a guide-plate, L, located between the roller I and the cutters, and provided with projections constructed to rest upon the roller I between the bands $i$ thereon, substantially as and for the purpose set forth.

9. The combination, with the cutters and matrices of a perforating-machine, of a feed-roller I, rollers J and J', opposed to said roller I, and bands $j$, placed over said rollers J and J', the said roller J having a vibratory movement toward and from the roller I, substantially as and for the purpose set forth.

10. The combination, with the cutters and matrices of a perforating-machine, of a feed-roller, I, rollers J and J', opposed to said feed-roller, and a vibrating feed-gage, M, located between the rollers J and J', said roller J having a vibratory movement toward and from the roller I, substantially as and for the purpose set forth.

11. The combination, with the cutters and matrices of a perforating-machine, of a feed-roller, I, bands $i$ upon said feed-roller, a guide-plate, L, provided with prongs, constructed to rest upon the said roller between the bands, and a vibratory feed-gage, M, provided with projections $m$, arranged opposite the said prongs and adapted to bear upon the latter when the gage is depressed, substantially as and for the purpose set forth.

12. The combination, with the cutters and matrices of a perforating-machine, of a feed-roller, I, rollers J and J', opposed to said roller I, said roller J having a vibratory movement toward and from the roller I, bands $j$, placed over said rollers J and J', and a vibrating feed-gage, M, provided with projections or prongs $m$, located between the bands $j$, substantially as and for the purpose set forth.

13. The combination, with the cutters and matrices of a perforating-machine, of a feed-roller, I, rollers J and J', opposed to said roller I, bands $j$, placed around said rollers J and J', movable supports for the roller J, a feed-gage, M, located at the rear of the roller J and between the rollers J and J', and connecting mechanism between the supports of the roller J and the feed-gage, constructed to depress the said roller J when the feed-gage is raised and to lift the said roller J when the feed-gage is depressed, substantially as and for the purpose set forth.

14. The combination, with the shafts C and

F, and the cutters and matrices thereon, of a rotary feed-roller, O, located at the exit side of the cutters and matrices, and a vertically-movably roller, O', mounted to rotate freely above the roller O and resting upon said roller, the surface of said roller O being driven faster than the speed at which the cutters travel at the line at which they engage the paper, substantially as and for the purpose set forth.

15. The combination, with the frame of a perforating-machine, of a stationary matrix-shaft, F, a hinged frame, D, a cutter-shaft, C, mounted in said frame D, a revolving cam-plate, G', a shaft, P, mounted in the machine-frame, arms P' and P², rigidly secured to the shaft P, a pin, $p^2$, upon the arm P', constructed to engage the cam-plate G', and suitable supporting-bars sustaining the free end of the frame D, at opposite sides of the machine from the arms P' and P², substantially as and for the purpose set forth.

16. The combination, with the machine frame, the hinged frame D, and the revolving cam G', of an arm, P', pivoted upon the machine-frame, and provided with a pin, $p^2$, engaging with the cam, and a notch, $p^4$, in its upper edge, and a bar, P³, pivoted at its upper end to said hinged frame and provided with a knife-edge at its lower end constructed to rest in said notch, substantially as and for the purpose set forth.

17. The combination, with the machine frame, the hinged frame D, and the revolving cam G', of a horizontal arm, P', pivoted to the machine-frame, a supporting-bar sustaining the free end of the frame D from the arm P', and a pin, $p^2$, having vertically-adjustable connection with the said arm P' and constructed to engage the cam, substantially as and for the purpose set forth.

18. The combination, with the machine frame, the hinged frame D, and the revolving cam G', of a horizontal arm, P', pivoted to the machine-frame, supports sustaining the free end of the frame D from the said arm, and a block, P⁴, provided with a pin, $p^2$, and pivotally connected at one end with the arm P' and adjustably connected at its free end with the said arm P', substantially as and for the purpose set forth.

19. The combination, with the machine frame, a matrix-shaft, F, having bearings therein, a cutter-shaft, C, and a cutter or cutters adapted for longitudinal adjustment upon the shaft, of a hinged frame, D, constructed to support the said cutter-shaft, and a detachable block, D⁴, affording bearings for one end of the shaft and detachably connected with the said frame D, whereby the bearing at one end of the shaft may be removed for the removal of the cutters from the shaft without disturbing the bearing at the opposite end of said shaft, substantially as described.

20. The combination of the machine-frame, the frame D, hinged to the machine-frame, and the cutter and matrix-shafts mounted in said frames, the latter being provided at points adjacent to the shaft-bearings at one side of the machine, one with a recess and the other with a projection constructed for mutual engagement when the said shafts are in position for operation, substantially as described.

21. The combination, with the cutter-shaft of a perforating-machine, the cutters mounted upon said shaft and adapted for longitudinal adjustment thereon, and a part, as D³, of the frame rigidly connected with the bearings of the shaft, of a support, as R, attached to the said part of the frame by connections permitting the adjustment of the said support longitudinally of the shaft, and a bearing-block, as R², fitted to slide upon the shaft and detachably secured to the said support, substantially as and for the purpose set forth.

22. The combination, with the cutters and matrices of a perforating-machine, a feed-table, feed-rollers I and J, a vertically-movable feed-gage M, and a shaft, M², supporting the feed-gage and located above the table, of a guide-strip, S, and an arm, T, attached to said strip, and having sliding connection with the said shaft, substantially as and for the purpose set forth.

23. The combination, with the feed-table and feed-gage of a perforating-machine, of a rod or shaft, M², for supporting the said feed-gage, located above the table, a guide-strip, S, and an arm, T, pivotally connected with the said strip and adapted both to slide and rotate upon the said shaft M², substantially as and for the purpose set forth.

24. The combination, with the feed-gage of a perforating-machine and a rock-shaft, M², supporting said feed-gage and located above the surface of the table, of a guide-strip, S, and arm T secured to said guide-strip, a bar, T', rigidly connected with the arm T and constructed to slide and rotate upon the shaft, and an adjustable block, T², for holding the arm T' from longitudinal movement upon the said shaft, substantially as and for the purpose set forth.

25. The combination, with the feed-table and feed-gage of a perforating-machine, and a rock-shaft, M², supporting the feed-gage and located above the surface of the table, of a guide-strip, S, an arm, T, secured to said guide-strip, a bar, T', rigidly connected with the arm T, and provided with apertured projections $t$, constructed to embrace the shaft, a block, T², provided with a notch, $t^3$, constructed to engage one of the projections $t$, and means for clamping the block T³ to the shaft, substantially as and for the purpose set forth.

26. The combination, with the feed-table and feed-gage of a perforating-machine, and a rock-shaft, M², supporting the feed-gage and located above the surface of the table, of a guide-strip, S, adjustably connected with the rock-shaft, and a clamp upon the outer end of the said guide-strip for securing the latter to the edge of the table, substantially as described.

27. An inclined receptacle, V, having upwardly-curved side walls converging as they approach its lower end, substantially as and for the purpose set forth.

28. The combination, with an inclined receptacle, V, having upwardly-curved converging side walls, of a laterally-expansible stop, W, adjustably supported within said receptacle, substantially as and for the purpose set forth.

29. The combination, with a receptacle, V, having upwardly-curved converging sides, of a stop, W, provided with sliding plates W³, and adjustably supported within the receptacle, substantially as and for the purpose set forth.

In testimony that I claim the foregoing as my invention I affix my signature in presence of two witnesses.

AUGUSTUS G. BURTON.

Witnesses:
C. CLARENCE POOLE,
OLIVER E. PAGIN.